(12) United States Patent
Iwami et al.

(10) Patent No.: US 6,992,449 B2
(45) Date of Patent: Jan. 31, 2006

(54) ELECTRIC POWER STEERING APPARATUS AND CONTROL METHOD OF THE SAME

(75) Inventors: Eiji Iwami, Tokyo (JP); Susumu Zeniya, Tokyo (JP); Takayuki Kifuku, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/959,067

(22) Filed: Oct. 7, 2004

(65) Prior Publication Data

US 2005/0258791 A1     Nov. 24, 2005

(30) Foreign Application Priority Data

May 18, 2004   (JP) .............................. 2004-148007

(51) Int. Cl.
*H02P 7/00*   (2006.01)
(52) U.S. Cl. .................. 318/432; 318/434; 318/433
(58) Field of Classification Search ........... 318/433, 318/434, 432; 180/65.2, 243
See application file for complete search history.

(56) References Cited

U.S. PATENT DOCUMENTS

| 4,869,333 A | 9/1989 | Morishita et al. |
| 6,053,001 A * | 4/2000 | Nunokawa et al. ........... 62/230 |
| 2003/0157383 A1 * | 8/2003 | Takahashi .................... 429/22 |

FOREIGN PATENT DOCUMENTS

JP       11-150976 A     6/1999

* cited by examiner

*Primary Examiner*—Karen Masih
(74) *Attorney, Agent, or Firm*—Sughrue Mion, PLLC (57) ABSTRACT

In an electric power steering apparatus in which a third motor target current is determined from a first motor target current determined on the basis of a detection torque from a steering torque detection means and a second motor target current determined using at least a detection value of the motor current detection circuit as one of inputs, and a motor drive signal is calculated on the basis of the third motor target current and a detection current from the motor current detection circuit to control a motor current, there is included a motor current detection circuit failure judgment means for judging a failure of the motor current detection circuit, and when a judgment of failure is made, at least the second motor target current is limited.

13 Claims, 5 Drawing Sheets

ELECTRIC POWER STEERING APPARATUS AND CONTROL METHOD OF THE SAME

BACKGROUND OF THE INVENTION

1. Field of the Invention

The present invention relates to a vehicle power steering control apparatus for assisting a steering torque, which is generated by a steering operation of a driver, by an electric motor and a control method of the same.

2. Description of the Related Art

This kind of conventional power steering control apparatus includes, for example, as disclosed in JP-B-6-59834 (page 6, FIG. 5), a torque sensor for detecting a rotation force of a steering wheel of a vehicle, a vehicle speed sensor for detecting a vehicle speed, a motor supplied with electric power from an in-vehicle battery and for transmitting an auxiliary torque to a steering system, and a power element part for controlling the flowing current and flowing direction of the motor. The power element part is controlled in accordance with signals of the torque sensor and the vehicle speed sensor, and when the motor current is zero at the time of energizing instructions of the motor current, a power element is judged to be opened, and the power element part is interrupted to prevent a defective steering from being generated when the power element is damaged.

However, the failure judgment condition as stated above is established also in a case where for example, a driver abruptly steers the steering wheel, a counter electromotive force is generated since the motor is rotated, and the motor current becomes excessively small by the counter electromotive force. Thus, there has been a problem that in order not to erroneously detect a failure, a failure judgment time must be set to be sufficiently long (for example, 5 sec).

Besides, when a motor current detection circuit goes wrong, not only the controllability of a motor current control part is deteriorated, but also a motor target current itself determined using a current detection value as one of inputs becomes an abnormal value. Thus, there has been a problem that the steering assist characteristic to the steering of the driver is further deteriorated.

SUMMARY OF THE INVENTION

The invention has been made to solve the problems as stated above, and provides an electric power steering apparatus and a control method of the same, which detects a failure state of a motor current detection circuit earlier, and can suppress the deterioration of a steering assist characteristic at the time of failure.

An electric power steering apparatus of this invention includes a steering torque detection means for detecting a steering force of a driver, a motor for assisting the steering force of the driver, and a motor current detection circuit for detecting a current of the motor, in which a third motor target current is determined from a first motor target current determined on the basis of a detection torque from the steering torque detection means and a second motor target current determined using at least a detection value of the motor current detection circuit as one of inputs, and a motor drive signal is calculated on the basis of the third motor target current and a detection current from the motor current detection circuit to control a motor current, and in which the electric power steering apparatus further includes a motor current detection circuit failure judgment means for judging a failure of the motor current detection circuit, and when a judgment of failure is made, at least the second motor target current is limited.

A control method of an electric power steering apparatus of the invention includes a step of calculating, on the basis of a detection torque of a steering torque detection means for detecting a steering force of a driver, a first motor target current of a motor for assisting the steering force of the driver and a second motor target current determined using at least a detection value of a motor current detection circuit for detecting a current of the motor as one of inputs, a step of determining a third motor target current from the first and the second motor target currents and of calculating a motor drive signal on the basis of the third motor target current and a detection current from the motor current detection circuit, and a step of limiting at least the second motor target current when the motor current detection circuit is judged to be out of order.

As described above, according to the electric power steering apparatus of the invention and the control method of the same, in the case where the motor current detection circuit goes wrong, the motor target current determined using the motor current detection value as one of inputs is interrupted or made zero, so that the deterioration of the steering assist characteristic at the time of the failure can be certainly suppressed.

DETAILED DESCRIPTION OF THE INVENTION

Embodiment 1

Figure 1:
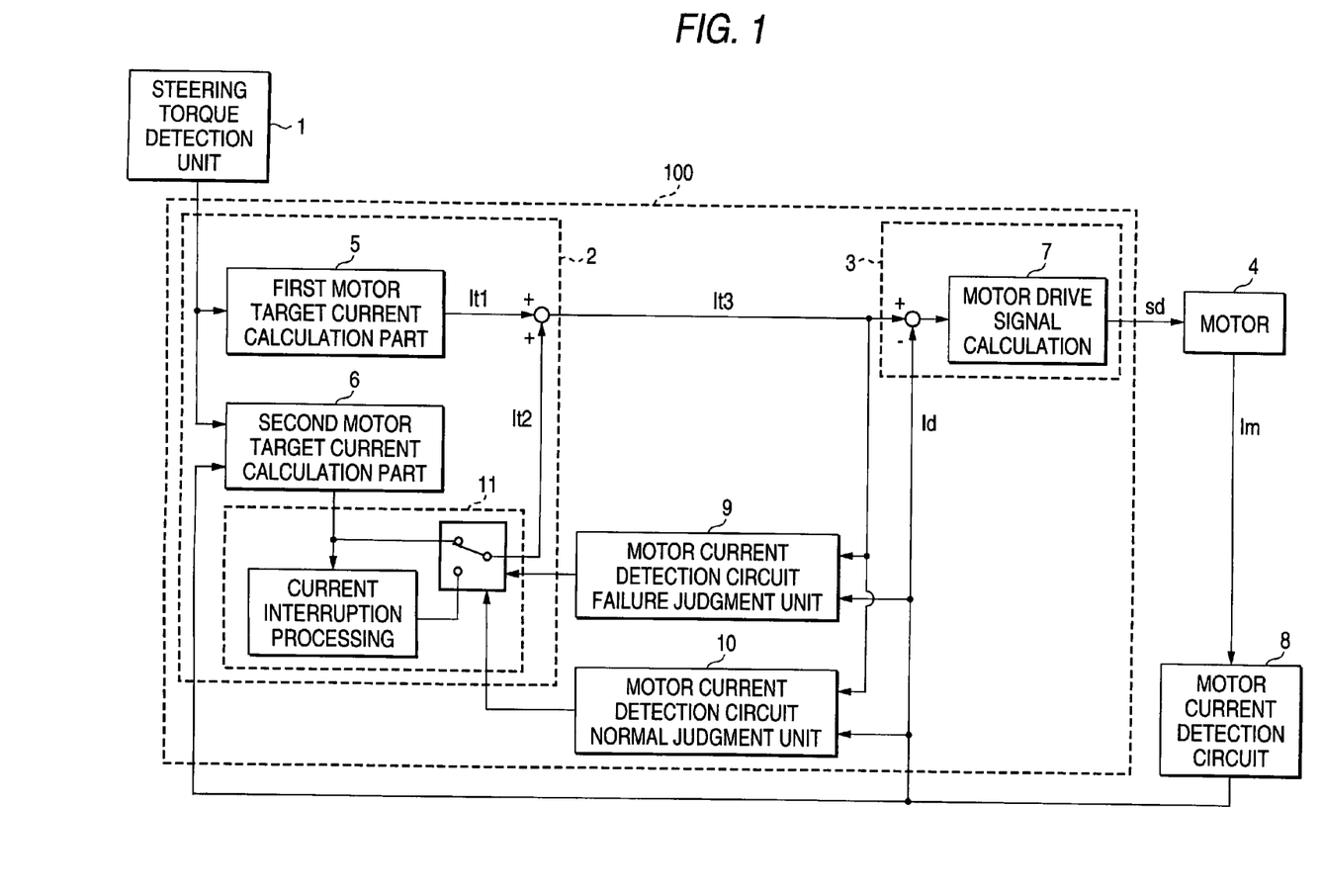
FIG. 1 is a structural view showing the control of electric power steering according to embodiment 1 of the invention.

FIG. 1 is a whole structural view showing the control of electric power steering according to embodiment 1 of the invention. In FIG. 1, an electric power steering apparatus is constructed of a steering torque detection means 1 for detecting a steering force of a driver, a motor 4 for assisting the steering force of the driver, a motor current detection circuit 8 for detecting a current Im of the motor, a target current calculation part 2 for calculating a current to be fed to the motor to assist the steering force of the driver, and a motor current control part 3 for calculating a motor drive signal Sd relative to a target current It3 from the target current calculation part 2 and for controlling the motor current.

The motor target current calculation part 2 includes a main first motor target current It1 determined on the basis of the detection torque from the steering torque detection means 1, and an auxiliary second motor target current It2 which is for the purpose of improving a steering feeling and is determined using at least a detection current Id from the motor current detection circuit 8 as one of inputs. The sum total of the first motor target current It1 and the second motor target current It2 is made the third motor target current It3.

Figure 5:
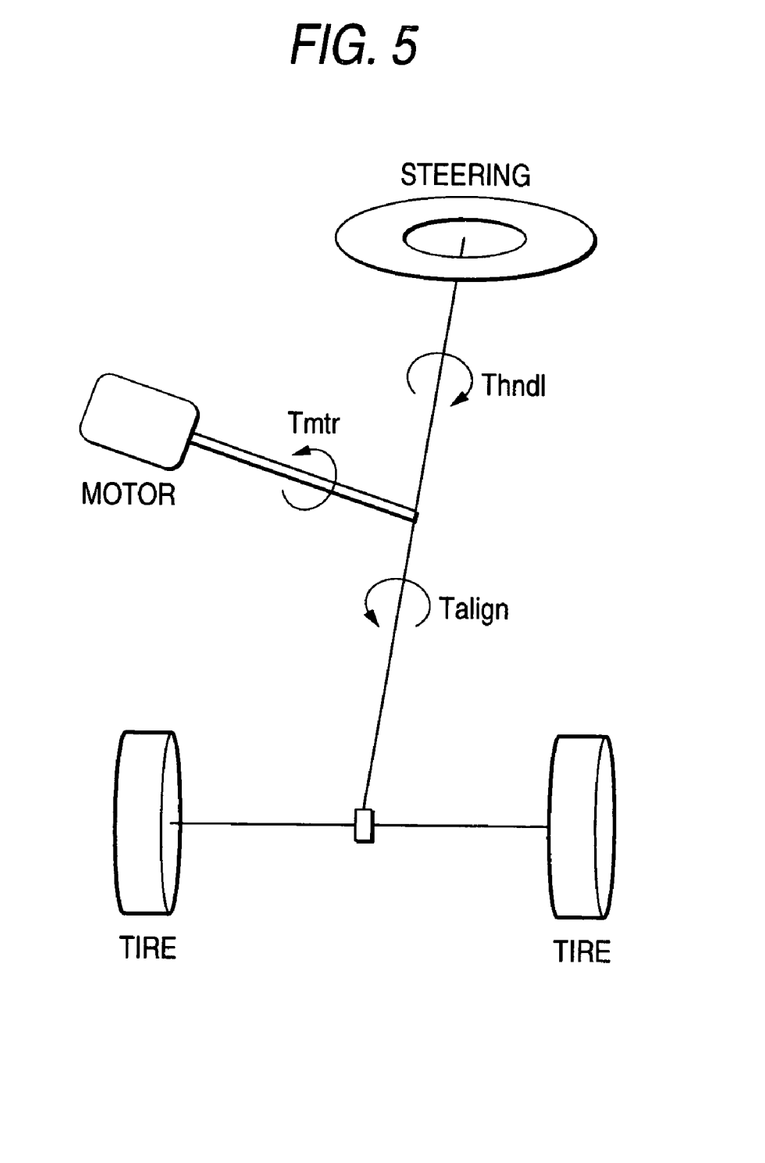
FIG. 5 is a structural view for explaining balance of forces of a steering system of an electric power steering apparatus.

As the auxiliary second motor target current It2 determined using at least the detection current Id from the motor current detection circuit 8 as one of inputs, there is known a control in which for example, in a vehicle having a small alignment torque, the alignment torque is estimated and is fed back to improve the return performance of steering. The second motor target current It2 in this case is calculated in such a manner that from the balance of forces of a steering system in the electric power steering apparatus shown in FIG. 5, an alignment torque Talign is estimated as indicated by expression (1), and this is multiplied by a gain G.

$$Talign = Thndl + Tmtr \qquad (1)$$

Talign: alignment torque
Thndl: steering torque
Tmtr: motor output torque (in terms of steering shaft)

Here, the steering torque Thndl is the detection torque from the steering torque detection means 1, and the motor output torque Tmtr is derived by multiplying the detection current Id from the motor current detection circuit 8 by a torque constant Kt of the motor and in terms of steering shaft.

The motor current control part 3 includes a motor drive signal calculation part 7, and on the basis of the third target current It3 from the motor target current calculation part 2 and the detection current Id from the motor current detection circuit 8, the motor drive signal is calculated so that a current deviation becomes zero and the motor current is controlled.

Here, for example, in the case where there occurs a failure that the detection value Id of the current detection circuit 8 becomes excessively small, the second motor target current It2 determined using the detection value Id as the input becomes an abnormal value, and an incorrect motor target current is inputted to the motor current control part 3. Further, in the motor current control part 3, since the deviation between the third target current It3 and the detection current Id becomes an abnormally excessively large value, a larger current than is necessary is fed to the motor 4, and as a result, the steering assist characteristic to the steering of the driver is deteriorated.

Thus, in this embodiment 1, the third target current It3 and the detection current Id from the motor current detection circuit 8 are inputted to a motor current detection circuit failure judgment means 9 and a motor current detection circuit normal judgment means 10. Judgment results of the motor current detection circuit failure judgment means 9 and the motor current detection circuit normal judgment means 10 are inputted to a motor target current limiting/canceling means 11 of the motor target current calculation part 2, and when a judgment of failure is made, the second motor target current It2 is interrupted, and when a judgment of normal is made, this interruption is canceled.

The motor target current calculation part 2, the motor current control part 3, the motor current detection circuit failure judgment means 9 and the motor current detection circuit normal judgment means 10 are included in a microcomputer 100.

Figure 2:
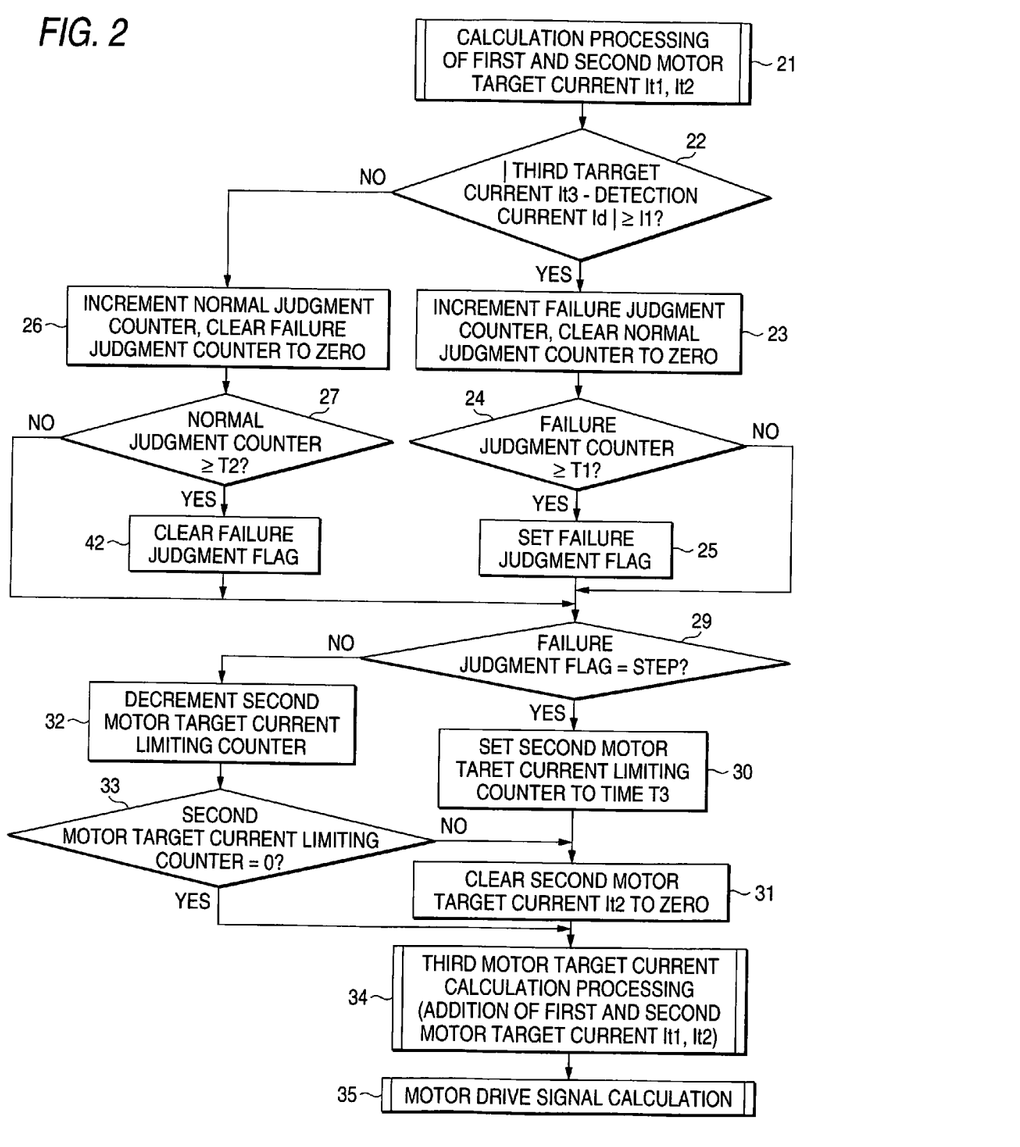
FIG. 2 is a flowchart showing the operation of the electric power steering according to the embodiment 1 of the invention.

Next, a judgment operation of embodiment 1 will be described. FIG. 2 shows the procedure of motor current detection circuit failure judgment and normal judgment in the microcomputer 100. The motor current detection circuit failure judgment means described here makes a judgment of failure in the case where a state in which a deviation between the third motor target current It3 and the motor current detection value Id is a predetermined value or more continues for a predetermined time or longer. The normal judgment means makes a judgment of normal in the case where a state in which the failure judgment condition is not established continues for a predetermined time. In the case where the judgment of failure is made, the second motor target current It2 is interrupted for at least a specific time.

In FIG. 2, first, at step 21, the first and the second motor target currents It1 and It2 are calculated. Next, at step 22, a deviation between the third motor target current It3 and the motor current detection value Id is calculated, and the absolute value of the deviation is compared with a predetermined value I1. In the case where the absolute value is the predetermined value I1 or more, a counter for failure judgment is incremented at step 23, and a counter for normal judgment is cleared to zero. Subsequently, at step 24, the value of the failure judgment counter is compared with a predetermined time T1, and in the case where the value is T1 or longer, a failure judgment flag is set at step 25. Here, the time T1 is set to a short time for the purpose of preventing a failure from being erroneously detected by the influence of noise or the like. In the case where input data used for the failure judgment means is resistant to the influence of noise or the like, the time T1 may be set to zero.

On the other hand, in the case where the absolute value is less than I1 at the judgment of step 22, the counter for normal judgment is incremented at step 26, and the counter for failure judgment is cleared to zero. Subsequently, at step 27, the value of the normal judgment counter is compared with a predetermined time T2, and in the case where the value is the time T2 or longer, the failure judgment flag is cleared at step 28. Here, the time T2 is set to a short time for the purpose of preventing the judgment of normal from being erroneously made by the influence of noise or the like. In the case where input data used for the normal judgment means is resistant to the noise or the like, the time T2 may be set to zero.

Next, at step 29, the state of the failure judgment flag is judged, and in the case where the flag is set, time T3 is set in a second motor target current limiting counter at step 30, and the second motor target current It2 is cleared to zero at step 31. On the other hand, at the judgment of step 29, in the case where the failure judgment flag is clear, the second motor target current limiting counter is decremented at step 32. Subsequently, at step 33, it is judged whether the counter is zero, and if not zero, the second motor target current is cleared to zero. In the case where the counter is zero, the second motor target current It2 is not cleared.

Next, at step 34, the first and the second motor target currents It1 and It2 are added to each other to obtain the final third motor target current It3, and it is inputted to the motor drive signal calculation part at step 35.

In the electric power steering apparatus constructed as stated above, for example, in the case where there occurs a failure that the detection value Id of the motor current detection circuit 8 becomes excessively small with respect to the third motor target current It3, the second motor target current It2 determined using the detection value of the failed motor current detection circuit 8 as one of inputs is interrupted in a short time (time T1) by the motor current detection circuit failure judgment means 9. Thus, it is possible to prevent the third target current It3 from being calculated on the basis of an abnormal signal, and the deterioration of the steering assist characteristic at the time of the failure can be suppressed.

On the other hand, in the motor current control part 3, since the excessively small detection value is inputted with respect to an actual motor current, an excessively large drive signal is calculated with respect to the third motor target current It3. However, in this case, since an excessively large current instantaneously flows through the motor, the steering torque is changed to a reverse direction value, and therefore, the direction of the first motor target current It1 is also reversed. Accordingly, by this repetition, the behavior of the steering can be suppressed to such a degree that a horizontal small vibration occurs. The frequency of this vibration becomes a resonant frequency (f1) of a steering system. However, in the case where the failure judgment is performed in the short time (time T1) as stated above, also in the case where for example, the driver abruptly steers the steering, the motor is rotated to generate a counter electromotive force, and the motor current becomes excessively small by this counter electromotive force, there is a possibility that the motor current detection circuit failure judgment condition is established.

Then, the normal judgment means 10 is provided, and in the case where a judgment of normal is made, the interruption of the second motor target current It2 is canceled, so that the deterioration of the steering feeling of the driver is prevented. Since the second motor target current It2 is originally an auxiliary current added for the purpose of improving the steering feeling, its current value is small as compared with the first motor target current determined on the basis of the detection torque. Thus, even if the second motor target current is temporarily inhibited in such abrupt steering that the motor current becomes excessively small by the counter electromotive force and the motor current detection circuit failure judgment condition is established, the influence on the motor drive signal hardly exists, and therefore, the influence on the steering feeling of the driver is very small.

In the failure in which the motor current detection value becomes excessively small, as described above, the steering has such behavior that the horizontal and small vibration occurs at the resonant frequency f1 of the steering system. In this case, since the deviation between the third motor target current It3 and the motor current detection value Id can become temporarily less than I1, there is provided a means for maintaining the interruption of the second motor target current It2 for a predetermined time (time T3) from the time when the judgment of failure was made. The time T3 is set to a level at which the second motor target current It2 can be continuously interrupted in the failure state, that is, T3>(1/f1).

By adopting the structure as stated above, without damaging the normal steering feeling, the second motor target current It2 is inhibited instantaneously and continuously at the time of the failure of the current detection circuit, and the deterioration of the steering assist characteristic can be suppressed.

In the above embodiment, although the second motor target current It2 is interrupted by the motor current detection circuit failure judgment means 9, the current may be limited to such a level that the steering assist characteristic at the time of the failure can be suppressed.

Besides, the calculation of an incorrect target current is prevented by the current detection circuit failure judgment means 9 in this way, and further, a means for interrupting a current in the case where a failure state is certainly judged may be provided by combining the failure judgment as described in the related art.

Embodiment 2

Figure 3:
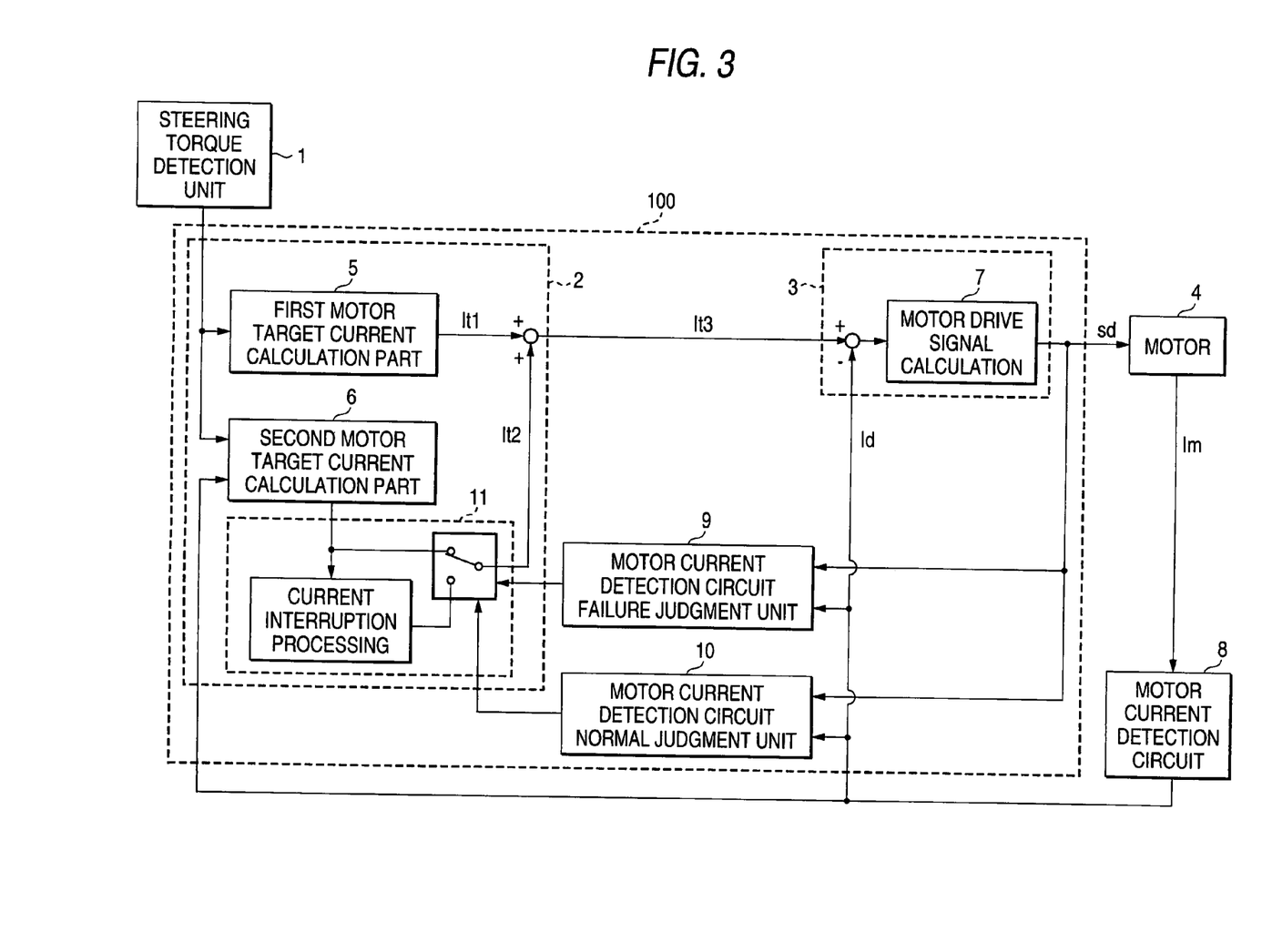
FIG. 3 is a structural view showing the control of electric power steering according to embodiment 2 of the invention.

FIG. 3 is a total structural view showing the control of electric power steering in embodiment 2 of this invention. In the embodiment 2, a motor drive signal Sd from a motor drive signal calculation part 7 of a motor current control part 3 and a detection current Id from a motor current detection circuit 8 are inputted to a motor current detection circuit failure judgment means 9 and a motor current detection circuit normal judgment means 10. Judgment results of the motor current detection circuit failure judgment means 9 and the motor current detection circuit normal judgment means 10 are inputted to a motor current limiting/canceling means 11 in a motor target current calculation part 2. When a judgment of failure is made, a second motor target current It2 is interrupted, and when a judgment of normal is made, this interruption is canceled.

Figure 4:
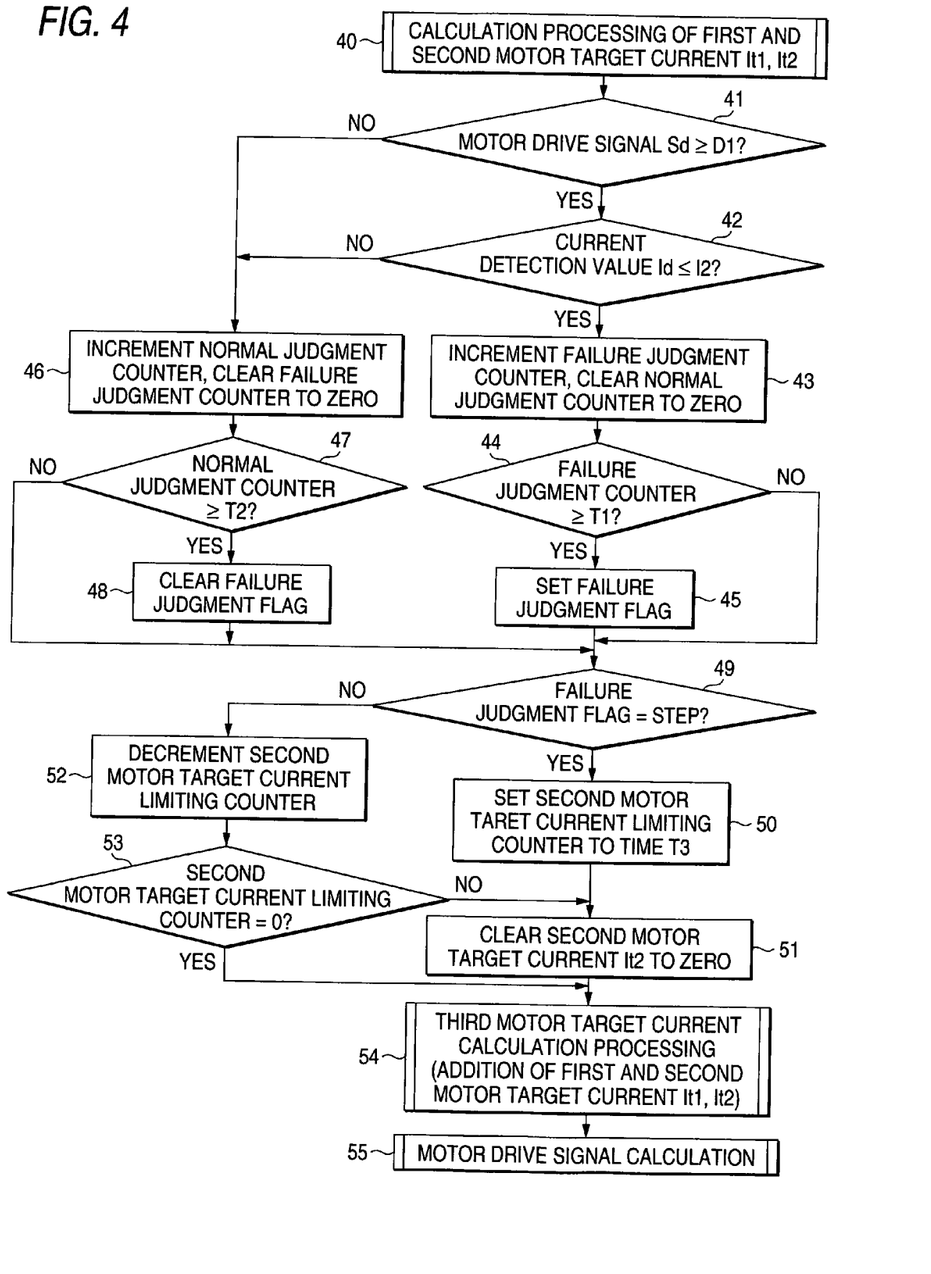
FIG. 4 is a flowchart showing the operation of the electric power steering according to the embodiment 2 of the invention.

Next, the judgment operation of the embodiment 2 will be described. FIG. 4 shows the procedure of motor current detection circuit failure judgment and normal judgment in a microcomputer 100. The motor current detection circuit failure judgment means 9 described here makes a judgment of failure in the case where a state in which the motor drive signal Sd is a predetermined value or more and the current detection value Id is a predetermined value or less continues for a predetermined time. The normal judgment means 10 makes a judgment of normal in the case where a state in which the failure judgment condition is not established continues for a predetermined time. In the case where the judgment of failure is made, the second motor target current It2 is interrupted for at least a specific time.

In FIG. 4, first, at step 40, the first and the second motor target currents It1 and It2 are calculated. Next, at steps 41 and 42, it is judged that the motor drive signal Sd is a predetermined value D1 or more, and the motor current detection value Id is a predetermined value I2 or less. In the case where both the conditions are established, at step 43, a counter for failure judgment is incremented, and a counter for normal judgment is cleared to zero. Subsequently, at step 44, the value of the failure judgment counter is compared with a predetermined time T1, and in the case where the value is the time T1 or longer, a failure judgment flag is set at step 45. Here, similarly to the embodiment 1, the time T1 is set to a short time for the purpose of preventing a failure from being erroneously detected by the influence of noise or the like.

On the other hand, at the judgment of steps 41 and 42, in the case where the motor drive signal Sd is less than the predetermined value D1 or the current detection value Id is larger than the predetermined value I2, the counter for normal judgment is incremented at step 46, and the counter for failure judgment is cleared to zero. Subsequently, at step 47, the value of the normal judgment counter is compared with a predetermined time T2, and in the case where the value is T2 or longer, the failure judgment flag is cleared at step 48. Here, similarly to the embodiment 1, the time T2 is set to a short time for the purpose of preventing a judgment of normal from being erroneously made by the influence of noise or the like.

Next, at step 49, the state of the failure judgment flag is judged, and in the case where the flag is set, time T3 is set in a second motor target current limiting counter at step 50, and the second motor target current It2 is cleared to zero at step 51. On the other hand, in the case where the failure judgment flag is clear at the judgment of step 29, the second motor target current limiting counter is decremented at step 52. Subsequently, at step 53, it is judged whether the counter is zero, and if not zero, the second motor target current It2 is cleared to zero. In the case where the counter is zero, the second motor target current It2 is not cleared.

Next, at step 54, the first and the second motor target currents It1 and It2 are added to each other to obtain the final third motor target current It3, and it is inputted to the motor drive signal calculation part at step 55.

Also in the electric power steering apparatus constructed as stated above, in the case where there occurs a failure that the detection value Id of the motor current detection circuit 8 becomes excessively small with respect to the third motor target current It3, similarly to the embodiment 1, the second motor target current It2 determined using the detection value of the failed motor current detection circuit 8 as one of inputs is interrupted in a short time (time T1) by the motor current detection circuit failure judgment means 9. Thus, it is possible to prevent the third target current It3 from being calculated on the basis of an abnormal signal, and as a result, the behavior of the steering can be suppressed to such degree that a horizontal small vibration occurs at the resonant frequency f1 of the steering system. Besides, also with respect to the erroneous detection, similarly to the embodiment 1, the normal return judgment means 10 is provided, and in the case where a judgment of normal is made, the interruption of the second motor target current It2 is canceled, so that the deterioration of the steering feeling of the driver is prevented.

In the failure in which the motor current detection value Id becomes excessively small, as described above, the steering has such behavior that the horizontal small vibration occurs at the resonant frequency f1 of the steering system. In this case, since the motor drive signal Sd can temporarily become less than D1, there is provided a means for maintaining the interruption of the second motor target current It2 for a predetermined time (time T3) from the time when the judgment of failure was made. The time T3 is set to a level at which in the failure state, the second motor target current It2 can be continuously interrupted, that is, T3>(1/f1).

By adopting the structure as stated above, without damaging the normal steering feeling, the second motor target current It2 is inhibited instantaneously and continuously at the time of the failure of the current detection circuit, and the deterioration of the steering assistant characteristic can be suppressed.

In the above embodiment, although the second motor target current It2 is interrupted by the motor current detection circuit failure judgment means 9, it may be limited to such a level that the steering assist characteristic at the time of the failure can be suppressed.

Besides, the calculation of an incorrect target current is prevented by the current detection circuit failure judgment means 9 in this way, and further, a means for interrupting a current in the case where a failure state is certainly judged may be provided by combining the failure judgment as described in the related art.

What is claimed is:

1. An electric power steering apparatus comprising:
    a steering torque detection means for detecting a steering force of a driver;
    a motor for assisting the steering force of the driver; and
    a motor current detection circuit for detecting a current of the motor,
    wherein a third motor target current is determined from a first motor target current determined on the basis of a detection torque from the steering torque detection means and a second motor target current determined using at least a detection value of the motor current detection circuit as one of inputs, and a motor drive signal is calculated on the basis of the third motor target current and a detection current from the motor current detection circuit to control a motor current, and
    wherein the electric power steering apparatus further comprises a motor current detection circuit failure judgment means for judging a failure of the motor current detection circuit, and when a judgment of failure is made, at least the second motor target current is limited.

2. An electric power steering apparatus according to claim 1, wherein the motor current detection circuit failure judgment means makes a judgment of failure when the detection value of the current detection circuit becomes excessively small.

3. An electric power steering apparatus according to claim 1, further comprising a motor current detection circuit normal judgment means for judging that the motor current detection circuit is normal, wherein when a judgment of normal is made, the limitation of the second motor target current is canceled.

4. An electric power steering apparatus according to claim 1, wherein the motor current detection circuit failure judgment means makes a judgment of failure when a deviation between the third motor target current and the motor detection current is a predetermined value or more.

5. An electric power steering apparatus according to claim 1, wherein the motor current detection circuit failure judgment means makes a judgment of failure when the motor drive signal is a predetermined value or more, and the motor current detection value is a predetermined value or less.

6. An electric power steering apparatus according to claim 4, wherein the motor current detection circuit failure judgment means makes a judgment of failure when the failure judgment condition continues for a predetermined period.

7. An electric power steering apparatus according to claim 5, wherein the motor current detection circuit failure judgment means makes a judgment of failure when the failure judgment condition continues for a predetermined period.

8. An electric power steering apparatus according to claim 1, wherein the motor current detection circuit normal judgment means makes a judgment of normal when a deviation between the third motor target current and the motor detection current is a predetermined value or less.

9. An electric power steering apparatus according to claim 1, wherein the motor current detection circuit normal judgment means makes a judgment of normal when the motor drive signal is a predetermined value or less, or the motor current detection value is a predetermined value or more.

10. An electric power steering apparatus according to claim 8, wherein the motor current detection circuit normal judgment means makes a judgment of normal when the normal judgment condition continues for a predetermined period.

11. An electric power steering apparatus according to claim 9, wherein the motor current detection circuit normal judgment means makes a judgment of normal when the normal judgment condition continues for a predetermined period.

12. An electric power steering apparatus according to claim 1, wherein when the judgment of failure is made by the motor current detection circuit failure judgment means, the limitation of the second motor target current is maintained for at least a predetermined period.

13. A control method of an electric power steering apparatus, comprising:

a step of calculating, on the basis of a detection torque of a steering torque detection means for detecting a steering force of a driver, a first motor target current of a motor for assisting the steering force of the driver and a second motor target current determined using at least a detection value of a motor current detection circuit for detecting a current of the motor as one of inputs;

a step of determining a third motor target current from the first and the second motor target currents and of calculating a motor drive signal on the basis of the third motor target current and a detection current from the motor current detection circuit; and a step of limiting at least the second motor target current when the motor current detection circuit is judged to be out of order.

* * * * *